United States Patent [19]
Demers

[11] 4,299,511
[45] Nov. 10, 1981

[54] CONNECTOR AND IMPERFORATE REINFORCEMENT PLATES IN COMBINATION

[75] Inventor: Harlan J. Demers, Marshallville, Ohio

[73] Assignee: Koppers Company, Inc., Pittsburgh, Pa.

[21] Appl. No.: 134,560

[22] Filed: Mar. 27, 1980

[51] Int. Cl.³ .............................................. B25G 3/28
[52] U.S. Cl. .................................... 403/282; 403/283; 403/405; 29/432; 29/526 R; 411/466
[58] Field of Search .............................. 411/461–468; 52/713, DIG. 6, 582; 403/405, 282, 283, 286; 29/432, 526 R

[56] References Cited

U.S. PATENT DOCUMENTS

| | | | |
|---|---|---|---|
| 1,373,036 | 3/1921 | Upson | 52/DIG. 6 |
| 1,402,304 | 1/1922 | Lord | 403/283 |
| 2,988,854 | 6/1961 | McKinley | 29/432 |
| 3,417,652 | 12/1968 | Menge | 411/466 |
| 3,436,883 | 4/1969 | Charman et al. | 29/432 |
| 3,498,170 | 3/1970 | Sanford | 411/468 |

Primary Examiner—Dave W. Arola
Attorney, Agent, or Firm—Donald M. MacKay

[57] ABSTRACT

A connector plate combination for connecting wooden members comprising a connector plate and an underlying substantially imperforate reinforcement plate, said connector plate having a body portion and a plurality of teeth extending generally transversely outwardly from said body portion, the central portion of said body portion overlying said reinforcement plate, and a plurality of said teeth being forced through said substantially imperforate reinforcement plate.

15 Claims, 12 Drawing Figures

CONNECTOR AND IMPERFORATE REINFORCEMENT PLATES IN COMBINATION

BACKGROUND OF THE INVENTION

Connector plate combinations for connecting wooden members are described in U.S. Pat. Nos. 3,417,652 and 3,498,170. They describe a plate having transverse projections or teeth mated with apertures of a reinforcement plate. The combination is then employed to join wooden members.

SUMMARY OF THE INVENTION

It has now been discovered that improved results can be obtained if the reinforcement plate is substantially imperforate and the teeth of the connector plate are both forced through the reinforcement plate and into the wood. Thus the convenience in using a prepunched reinforcement plate is outweighed by the fact that alignment of the plates is required to mate the teeth with the apertures and a good fit of the reinforcement plate around the corners of wooden beams is more difficult. Further, it is difficult to make holes or apertures of the proper size for a tight fit when the teeth are inserted and thus the bond is not as secure. Moreover, the prepunched reinforcement plates may have less strength because of the material lost to make the holes.

Surprisingly, it has been found that superior bonds are obtained when an imperforate reinforcement plate is employed.

DETAILED DESCRIPTION OF THE INVENTION

Figure 1:
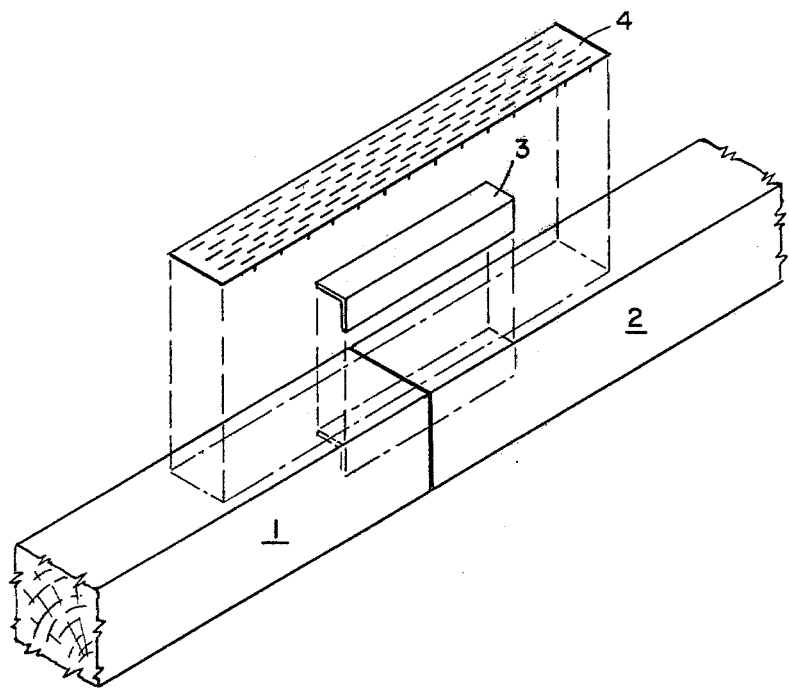
FIG. 1 is an isometric view of a column connector plate and an angle reinforcement plate used to join two wood columns.

Referring now to the drawings, FIG. 1 depicts two colums 1 and 2, a preformed angle reinforcement plate 3 and a connector plate 4. In addition to the reinforcement and connector plates shown, there are three more of each or one reinforcement plate on each corner and one connector plate on each flat piece.

Figure 2:
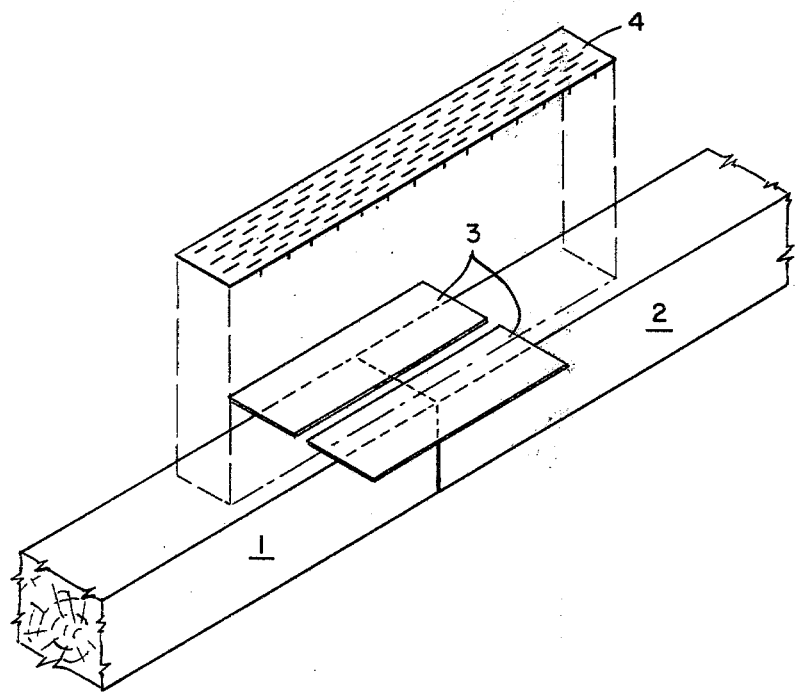
FIG. 2 is an isometric view of a column connector plate and two flat reinforcement plates which are bent after the connector plate affixes them to the columns.

In FIG. 2, the reinforcement plate 3 is not preformed but is bent around the column angles at the same time or after the connector plate is applied. In addition to the two reinforcement plates and single connector plate shown, three connector plates and an additional two reinforcement plates are required to provide full support.

Figure 3:
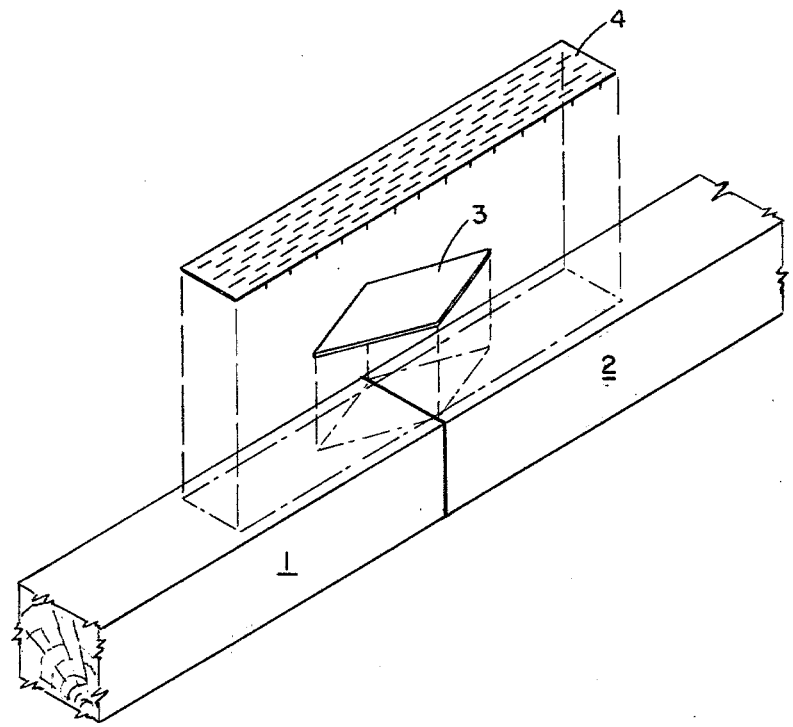
FIG. 3 is an isometric view of a column connector plate and a diamond shaped reinforcement plate.

In FIG. 3, reinforcement plate 3 is shown in diamond shape which serves to concentrate the stress in the area of members 1 and 2 immediately beneath plate 3 and to increase the lateral load capacity of each tooth penetrating it.

Figure 4:
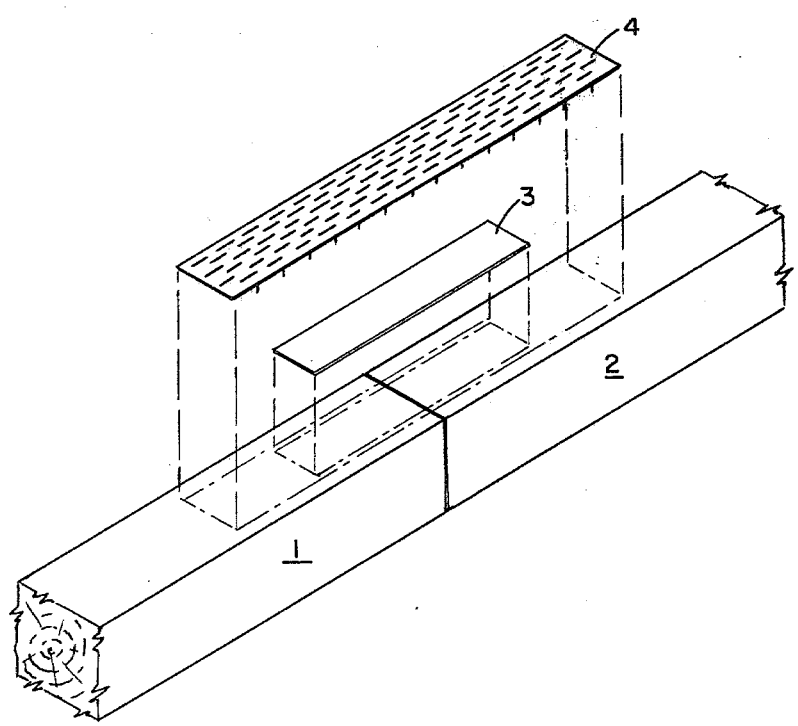
FIG. 4 is an isometric view of a column connector plate and a rectangular shaped reinforcement plate of less area than the two columns to be joined.

In FIG. 4, reinforcement plate 3 is rectangular in form and of less width than the columns side on which it is placed which serves to concentrate the stress in the area of members 1 and 2 immediately beneath plate 3 and to increase the lateral load capacity of each tooth penetrating it.

Figure 5:
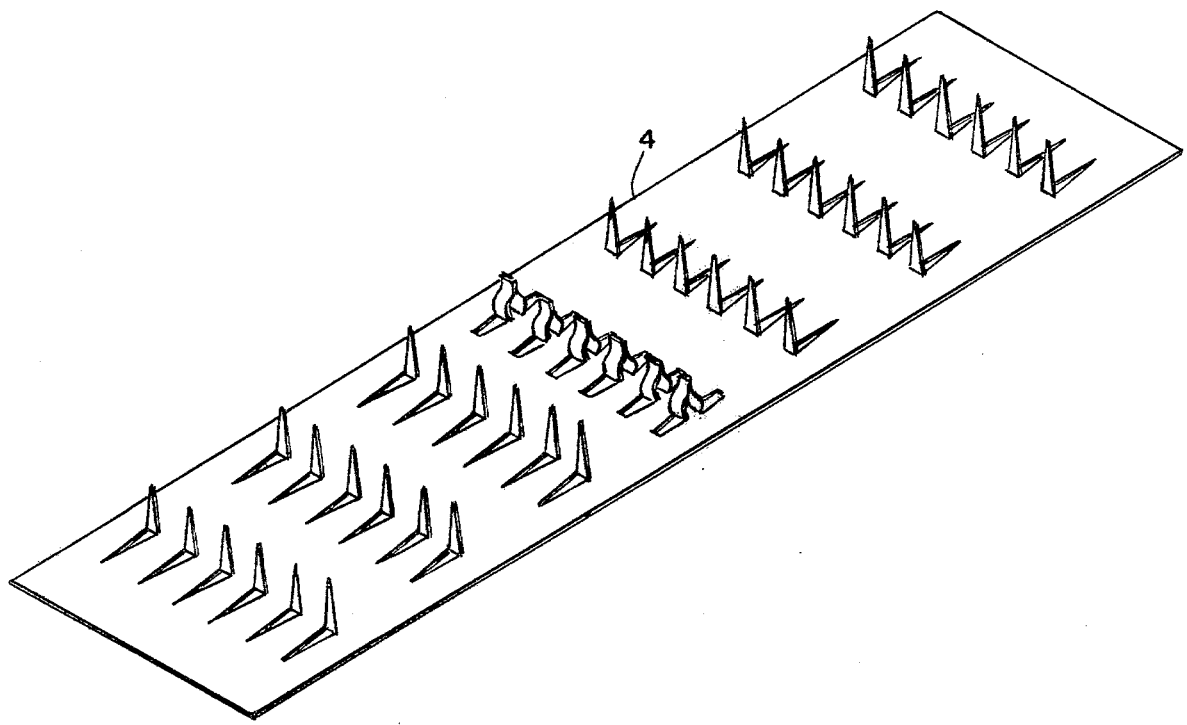
FIG. 5 is an isometric view of a column connector plate having a center row of splice bearing and adjustment teeth.

In FIG. 5, a specially designed connector plate is shown with centrally located splice bearing and adjustment teeth which are pushed between the butt joints of the columns which serve to compensate for surface irregularities and to reduce initial slippage.

The other teeth in the connector plate are longer than the splice bearing teeth because they restrain the members to be joined, allowing the bearing adjustment teeth to seat into abutted surfaces.

Figure 6:
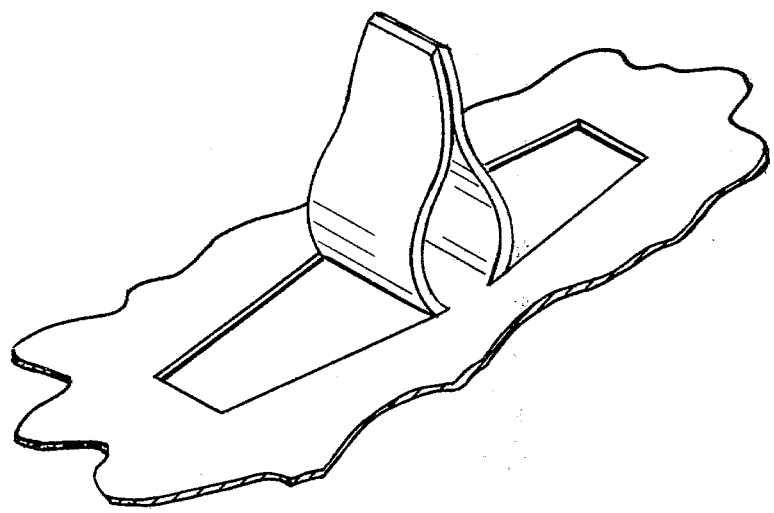
FIG. 6 is an isolated detail view of the splice bearing and adjustment teeth of FIG. 5.

In FIG. 6, a splice bearing and adjustment tooth of FIG. 5, is shown in detail.

Figure 7:
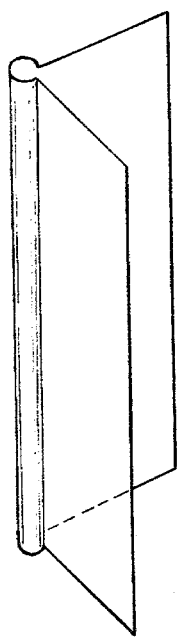
FIGS. 7-10 are reinforcement column plates which have been crimped in various ways to provide more support.

In FIG. 7, a reinforced corner plate is shown with wire providing the reinforcement.

Figure 8:
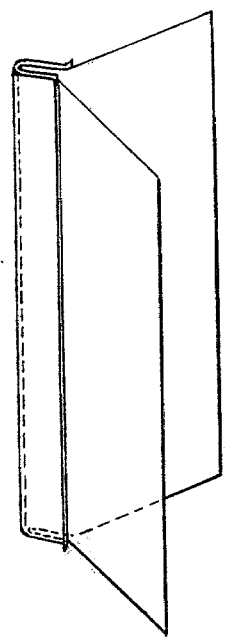

In FIG. 8, a reinforcement angle plate is formed by applying a U-shaped clip to the deformed sheet metal.

Figure 9:
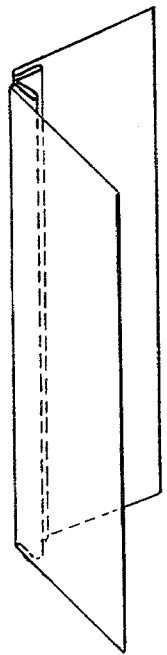

In FIG. 9, a reinforcement angle plate is formed with a double bend at the corner on the interior side.

Figure 10:
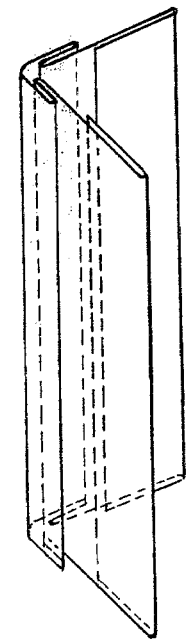

In FIG. 10, a reinforcement angle plate is formed with a double bend at the corner on the exterior side.

Figure 11:
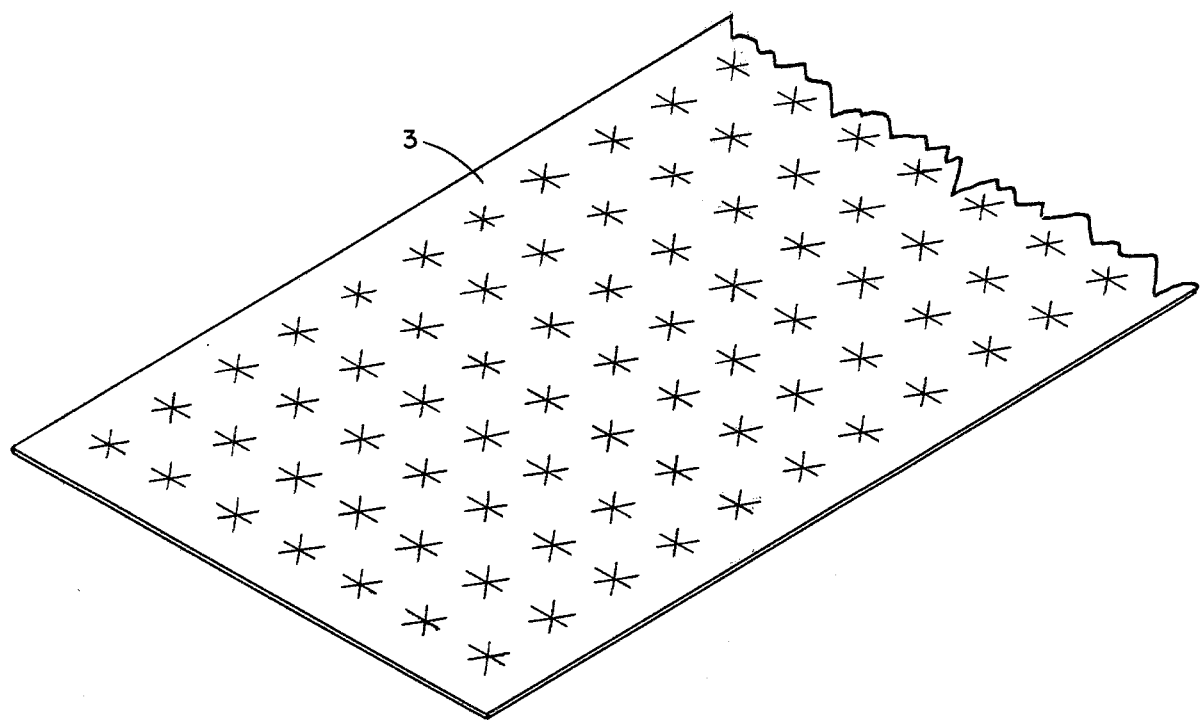
FIG. 11 is a plan view of a reinforcement plate with an imprinted design of depressions of reduced thickness.

In FIG. 11, a reinforcement plate is shown with an imprinted design for receiving the connector plate teeth.

Figure 12:
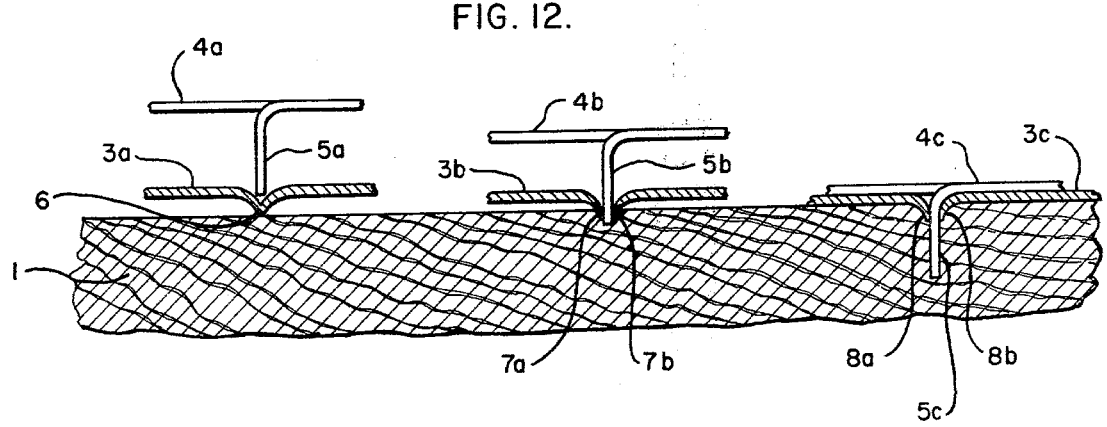
FIG. 12 is an isometric view of a tooth of a connector plate and the action when forced through the depression in a reinforcement plate.

In FIG. 12, a tooth 5a of connector plate 4a is centered in depression 6 of reinforcement plate 3a. When pressed, tooth 5b penetrates reinforcement plate 3b and penetrates wood column 1 with the splayed ends 7a and 7b formed from depression 6. When fully compressed, connector plate 4c and reinforcement plate 3c are in contact with tooth 5c reinforced by splayed ends 8a and 8b.

In the art an "exterior" type connector plate with or without a perforated reinforcement plate is used to connect structural members that are joined in abutting relation. The connector plate combination constructed according to the invention comprises the connector plate and an imperforate reinforcement plate to lie snugly between the connector plate and the wooden members joined thereby.

The connector plate has a plurality of teeth which extend transversely outwardly of the plate from which they are struck or punched. Each tooth is tapered and of sufficient size and length to punch through the reinforcement plate and into the wooden members without being easily removed. For example, a typical connector plate will be from 0.0336" to 0.0785" and a reinforcement plate will be from 0.0217" to 0.125" thick and to splice wooden members between about 4" and about 6" deep, the connector plate teeth will be between about ⅝" and about 1" long and have a width of between about 1/10" and about 3/16" at its greatest measurement.

The plier like splice bearing and adjustment teeth of FIGS. 5 and 6 will be somewhat shorter in length or from about ½" to about ⅝", and somewhat thicker in girth of from about ¼" to about 5/16" because of the configuration of the tooth.

The connector plate will alternatively have an imprinted pattern with depressions of from about a maximum of ½ of the thickness of the plate to a minimum of about 0.02" which permits the use of heavier plates without requiring an increased force to drive the connector plate teeth through the reinforcement plate. In addition, imprinting reinforces the connector plate teeth by providing a predictable projection shape to increase the lateral resistance of said teeth. Thus the imprinting allows one to select a design whereby the perforation formed will have a uniform casing or side walls to provide lateral support. When the reinforcement plate is not imprinted with a design, the resulting perforation can have sides of unequal length.

Fourteen 38" southern pine 4"×4" wood specimens were separated in pairs cut at midpoint, match marked and each half joined with the other half of the same cut orientation to minimize differences between specimens. Each corner was reinforced with an angle 1¼"×1¼"×8" reinforced plate of 26 guage steel and each side of the specimens were fitted with two ⅝"×8" 18 guage steel connector plates wherein the teeth of the connector plates penetrated the reinforcement plates.

Employing a Tinius-Olsen Electromatic 2 Universal testing machine fited with a Deflectometer and Houston Instrument Co. Omnigraphic 2000 XY Recorder, the work to proportional limit was determined by applying loads 6" from the center on each half member and the beams were supported 1" from the end of each half member. The results were averaged and found to be an average of 44% greater than the same specimens, but for the exception that perforated reinforcement plates were used in which the perforations were the size of the largest width of the teeth (3/16") of the connector plate.

The work to proportional limit is a measure of the work that a beam is able to resist without being stressed beyond the proportional limit as determined under slowly applied loads. The proportional limit is the greatest stress that can be applied to an elastic body without causing its permanent deformation.

The work to proportional limit for test comparison purposes was computed on the same basis as used for monolithic prismatic beams except the effects of shear deformation were omitted. The formula used appears in the 1976 annual book of ASTM Standards, page 119, ASTM designation D-198, Static Test of Timbers in Structural Sizes.

What is claimed:

1. A connector plate combination for connecting wooden members comprising a connector plate and an underlying substantially imperforate reinforcement plate, said connector plate having a body portion and a plurality of teeth extending generally transversely outwardly from said body portion, the central portion of said body portion overlying said reinforcement plate, and a plurality of said teeth being forced through said substantially imperforate reinforcement plate.

2. The combination of claim 1 wherein said teeth are forced into adjoining wooden members to connect said members.

3. The combination of claim 1 wherein the reinforcement plate is of less width than the connector plate.

4. The combination of claim 1 wherein the reinforcement plate is reinforced in the center section.

5. The combination of claim 1 wherein the connector plate has a plurality of plier like splice bearing and adjustment teeth in the center section for insertion between two wooden members to be joined.

6. The combination of claim 1 wherein the reinforcement plate is imprinted with a design having depressions of reduced thickness for penetration of the connector plate teeth.

7. The combination of claim 1 wherein the reinforcement plate is diamond shaped.

8. The combination of claim 1 wherein the connector and reinforcement plates are shaped to form right angles to mate with the wooden members.

9. In a method of joining wooden members with a connector plate combination comprising a connector plate having a body portion and a plurality of teeth extending generally transversely outwardly from said body portion, and a reinforcement plate underlying said connector plate whereby a plurality of said teeth are forced into said wooden members to join them, the improvement which comprises forcing a plurality of said teeth through an imperforate reinforcement plate prior to joining said wooden members.

10. The method of claim 9 wherein the connector and reinforcement plates are shaped to form right angles to mate with the wooden members.

11. The method of claim 9 wherein the reinforcement plate is of less width than the connector plate.

12. The method of claim 9 wherein the reinforcement plate is reinforced in the center section.

13. The method of claim 9 wherein the connector plate has a plurality of plier like splice bearing and adjustment teeth in the center section for insertion between two wooden members to be joined.

14. The method of claim 9 wherein the reinforcement plate is diamond shaped.

15. The method of claim 9 wherein the reinforcement plate is imprinted with a design having depressions of reduced thickness for penetration of the connector plate teeth.

* * * * *